(12) United States Patent
Garcia, Jr. et al.

(10) Patent No.: US 6,470,357 B1
(45) Date of Patent: Oct. 22, 2002

(54) SYSTEM AND METHOD OF ENHANCED DIRECTORY SERVICES FOR TELECOMMUNICATIONS MANAGEMENT NETWORK APPLICATIONS

(75) Inventors: Devanir Garcia, Jr., Campinas (BR); John E. Dinger, Apex, NC (US); Luiz A. Rolim, Campinas (BR)

(73) Assignee: International Bussiness Machines Corp., Armonk, NY (US)

( * ) Notice: Subject to any disclaimer, the term of this patent is extended or adjusted under 35 U.S.C. 154(b) by 0 days.

(21) Appl. No.: 09/343,483

(22) Filed: Jun. 30, 1999

Related U.S. Application Data

(60) Provisional application No. 60/094,337, filed on Jul. 28, 1998.

(51) Int. Cl.[7] .............................................. G06F 17/30
(52) U.S. Cl. ...................... 707/200; 707/202; 707/203; 707/204
(58) Field of Search ................................. 707/200, 202, 707/203, 204

(56) References Cited

U.S. PATENT DOCUMENTS

| | | | | |
|---|---|---|---|---|
| 5,483,652 A | * | 1/1996 | Sudama et al. | 707/10 |
| 5,764,982 A | * | 6/1998 | Madduri | 707/10 |
| 5,893,118 A | * | 4/1999 | Sonderegger | 707/203 |
| 5,987,471 A | * | 11/1999 | Bodine et al. | 707/103 |
| 6,000,031 A | * | 12/1999 | Bingaman et al. | 713/200 |
| 6,049,799 A | * | 4/2000 | Mangat et al. | 707/10 |
| 6,061,799 A | * | 5/2000 | Eldridge et al. | 713/202 |
| 6,081,814 A | * | 6/2000 | Mangat et al. | 707/501 |
| 6,144,959 A | * | 11/2000 | Anderson et al. | 707/9 |
| 6,173,289 B1 | * | 1/2001 | Sonderegger et al. | 707/103 |
| 6,247,017 B1 | * | 6/2001 | Martin | 707/102 |
| 6,256,634 B1 | * | 7/2001 | Moshaiov et al. | 707/100 |
| 6,324,571 B1 | * | 11/2001 | Hacherl | 709/208 |
| 6,330,560 B1 | * | 12/2001 | Harisson et al. | 707/8 |

FOREIGN PATENT DOCUMENTS

| | | | | |
|---|---|---|---|---|
| EP | 0213276 | * | 11/1987 | G06F/15/40 |

* cited by examiner

*Primary Examiner*—Frantz Coby
(74) *Attorney, Agent, or Firm*—Joseph C. Redmond, Jr.; Morgan & Finnegan, LLP

(57) ABSTRACT

In a telecommunication management network Applications can transmit messages to other applications without maintaining routing and characteristic information for each target application. The enhanced directory services feature maintains the routing and characteristic information and provides the information as needed to either the transmitting application or a dispatcher process 304, which routes the message without further assistance of the transmitting application. This simplifies the functions that must be embedded in the application. Thus, as the routing information or the characteristic information of the application entities changes, the applications continue to function properly. Each user environment accessing the enhanced directory services database can elect when and how it handles changes to the enhanced directory services database.

10 Claims, 4 Drawing Sheets

SYSTEM AND METHOD OF ENHANCED DIRECTORY SERVICES FOR TELECOMMUNICATIONS MANAGEMENT NETWORK APPLICATIONS

PRIORITY INFORMATION

This application claims priority from U.S. Provisional application Ser. No. 60/094,337, filed Jul. 28, 1998.

CROSS-REFERENCE TO RELATED APPLICATIONS

This application is related to the following applications:
(1) Ser. No. 09/343,232 (BC9-98-059/1963-7253US1), entitled "A Telecommunications Management Network System and Method for Mapping a Multi-Threaded Persistent Agent Management Information Base to a Configurable Data Base to Store Managed Objects, Attributes and Internal Implementation Details";
(2) Ser. No. 09/343,236 (BC9-98-061/1963-7254US1), entitled "A System and Method For User Definable Attributes for Association Control in a Telecommunications Management Network Using OSI"; and
(3) Ser. No. 09/343,729 (BC9-98-060/1963-7252US1), entitled "A System And Method For Application Independent Association Control Using Directory Services For Parameter Modification, Dynamic Directory Updates And Changing Association Control Types," all assigned to same assignee as the present application are filed concurrently Jun. 30, 1999.

BACKGROUND OF THE INVENTION

1. Field of the Invention

This invention relates to a system and method that routes messages between applications. More particularly, the invention relates to routing messages, for example CMIP request messages, between telecommunication management applications without requiring the sending application to know which application should receive the message and the characteristics of the application that will receive the message.

2. Background of the Invention

Applications, including agents and managers, in the telecommunications management network ("TMN") Environment, need to transmit messages to other applications. However, monitoring and tracking which application is performing which function is cumbersome and time consuming for an application. It is therefore highly desirable that an application be able to transmit a message, such as a Common Management Information Protocol (CMIP) request, without knowing which application will receive and respond to the request.

Since the TMN environment is dynamic, the management information often changes. For example, changes may include TMN applications' characteristics, such as an Application Entity Title ("AET"), modifications to the location of TMN applications within the network, such as a Presentation Address, or modifications to parameters which are needed for Association Control Service Element ("ACSE"), such as parameters used for association establishment, including Access Control, SMASE User Data, and Functional Units. As these application characteristics change, applications attempting to contact them must be notified of the changes or else communication will be unsuccessful.

Because the management information, including routing information, is dynamic and is referenced numerous times by the various applications, it is desirable to be able to access the management information rapidly and manipulate it as needed in a simple and expeditious manner. This would reduce the existing performance degradation that occurs during message routing. Routing information includes the information required to route a message between application and message format information as required by the receiving application. Message format information includes the characteristics of the managed object, that is the receiving application, and Association Control service elements ("ASCF") information associated with the receiving application.

Existing TMN systems fail to address the above identified problems. Information required to establish an association between applications is not contained in conventional directory services databases and provided to user applications. Current implementations fail to provide runtime notification to user applications of changes that occur in remote directory services database. Further, existing systems fail to support user environments that control when their local directory services databases are automatically updated.

Existing applications implementing the X-Open's Directory Services API ("XDS") standard must imbed the complexity of X/Open OSI-Abstract Data Manipulation ("XOM") objects manipulation and the performance penalty of implementing X-500 Directories. Existing systems fail to provide all association information and application characteristic information in a single location that is accessible to user applications in a network wide consistent format.

Further, existing systems fail to provide thread-safeness, efficient directory caching and efficient usage of memory to maximize performance in thread-safe APIs. Additionally, current Directory Services implementations do not provide an API that is directly usable by TMN applications.

SUMMARY OF THE INVENTION

An objective of the invention is to allow a TMN agent or manager application to use the Enhanced Directory Services to retrieve CMIP routing information from directory services such that the application need not track and monitor the information about the requested application.

Also, an object of the invention is to allow TMN agent applications and manager applications to send and receive CMIP messages to and from a dispatcher application. The dispatch application routes the CMIP request using the information in the Enhanced Directory Services.

A further object of the invention is to provide enhanced directory services that allow applications to use the Enhanced Directory Services to retrieve message routing information, including CMIP routing information, from a database or a directory file.

These and other objects, features and advantages are achieved in a TMN system with enhanced directory services that maintain routing and characteristic information.

DESCRIPTION OF THE DRAWINGS

The invention will be further understood from the following detailed description of a preferred embodiment taken in conjunction with the appended drawings. The first digit of three digit reference numbers or the first two digits of four digit reference numbers indicates the drawing in which the element first appears. Like reference indicate similar elements and in which.

DETAILED DESCRIPTION

In the TMN network management framework within the open system interconnection ("OSI") protocol, an agent, also called "TMN agent" can make management information available to managers, also called "TMN managers." Thus, TMN agents offer client applications an open CMIP interface. The TMN agent maintains its management information in a Management Information Base ("MIB").

In a telecommunications management network ("TMN") system, such as IBM's Telecommunications Management Network Environment ("TMNE"), messages are routed between applications, also known as application entities. For example, an application may need to send a Common Management Information Protocol ("CMIP") request to the application managing a particular resource. However, the requesting application may not know which application is managing that resource. The requesting application uses an enhanced directory services ("EDS") to route the message and determine the characteristics of the requested application. Thus, in the current system, the application need not maintain a master list of which application is the appropriate recipient of each message and the routing information and characteristics for that application.

An implementation of the present invention can be found in the following products and filesets: 1. IBM TMN Support Facility product; 2. IBM TMN Support Facility-Directory Services Runtime fileset; 3. IBM TMN Support Facility-Directory Services Client Runtime fileset; 4. IBM TMN WorkBench product; and 5. IBM TMN WorkBench—Directory Services API fileset. These products are version 3.1 and are scheduled for general availability on Jul. 31, 1998. These applications were developed in the C++ programming language with a Standard Templates Library ("STL") and a commercial threads toolkit library. The target operating systems include IBM's AIX and Hewlett Packard's HP-UX.

Figure 3:
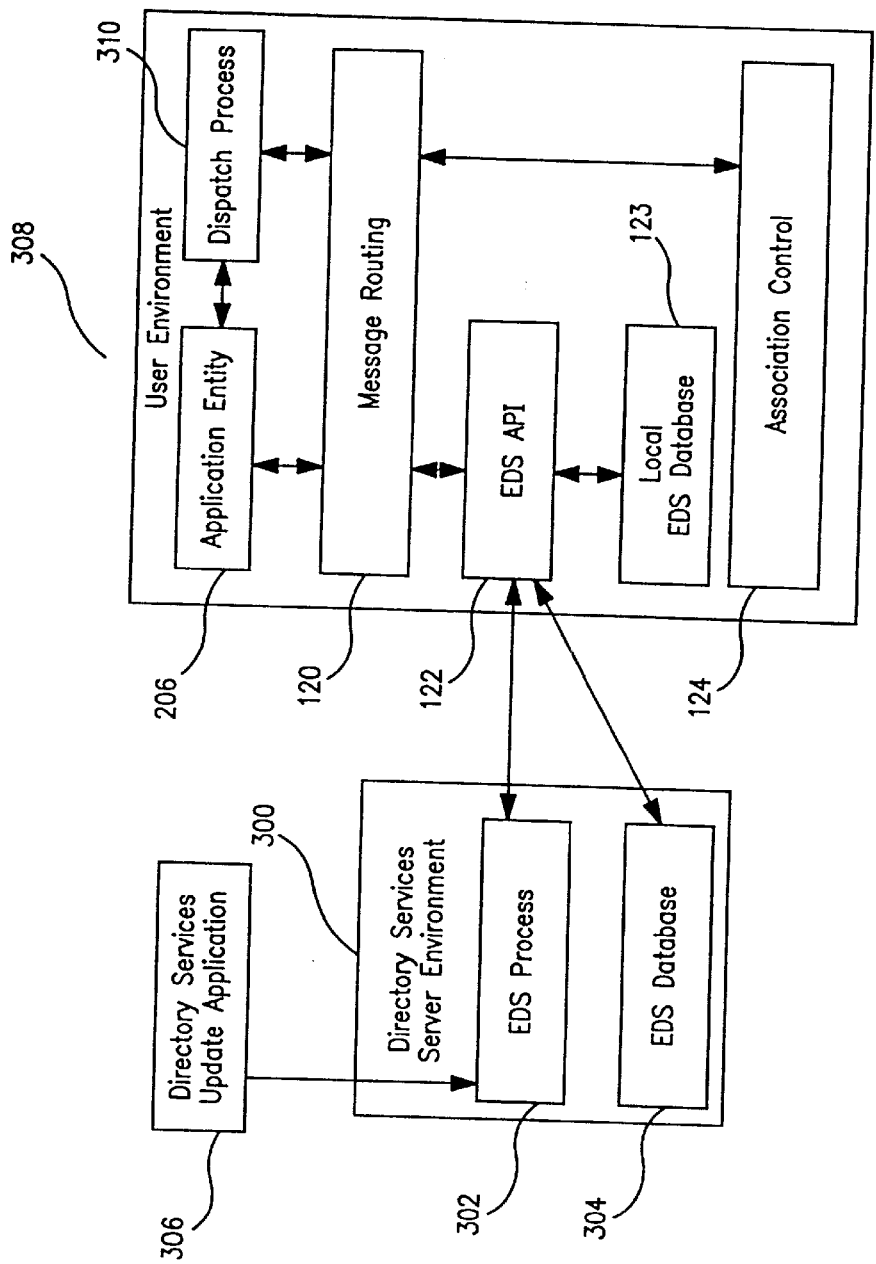
FIG. 3 is a representation of a routing and association control entity communicating with a main directory services entity.

The present invention maintains dynamic routing information and provides routing information for such messages. As shown in FIG. 3, routing information may be used directly by the requesting application or by a dispatcher process that routes the message between requesting and requested applications. In the case of a dispatcher process 310, the requesting application need never know the routing information.

The dispatcher process 310 uses an EDS API 122 to look up routing information and for additional information concerning CMIP peers which will receive CMIP messages.

Because of the performance degradation associated with providing such information from an EDS Database 304 across a network each time an application transmits a message, the present system caches the management information in a local EDS Database 123 in string formats. String format allows applications to easily manipulate the data. To further enhance the performance of the system, the directory services process supports multi-threading, that is, parallel processing of Enhanced Directory Services API queries from applications.

The present system allows a message to be properly routed between TMN agents and TMN manager applications. A CMIP request represents an operation to be performed on a managed object in the TMN system. The Enhanced Directory Services make the deployment and configuration of applications in the TMN environment easier and more flexible because it allows for runtime modifications of TMN applications' characteristics (such as change in Application Entity Titles), modifications in the location of TMN applications in the network (such as change in the Presentation Address) or modifications in parameters which are needed for Association control service elements ("ACSF"), such as parameters used to establish an association, like Access Control, SMASE User Data, and Functional Units.

Figure 1:
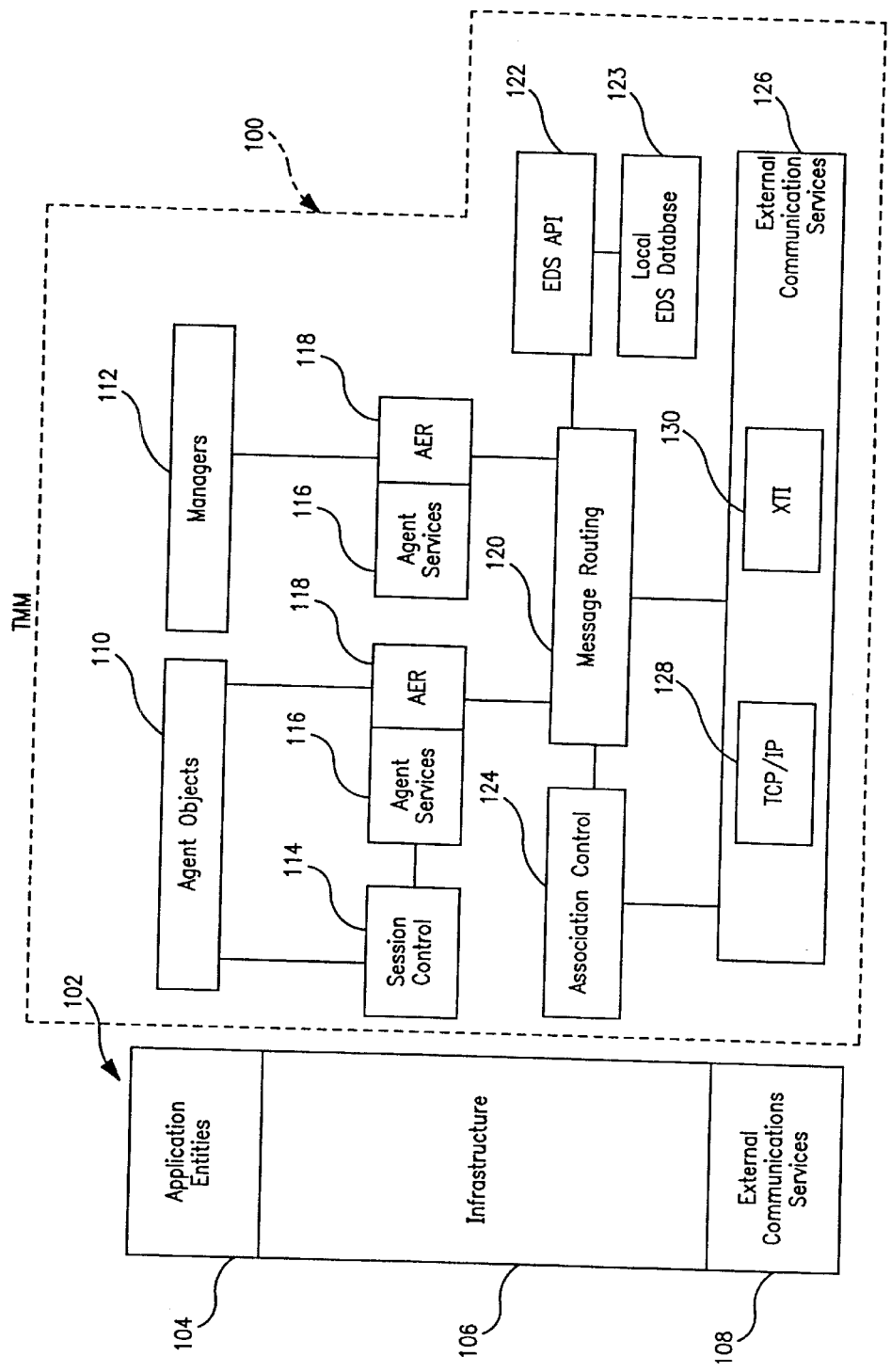
FIG. 1 is a representation of various functions of an Enhanced Directory Services Network.

In FIG. 1, a telecommunication management network ("TMN") 100 is illustrated in relation to a protocol hierarchy 102. The protocol hierarchy 102 consist of an application entities layer 104, an infrastructure layer 106, and an external communications services layer 108 that is part of an external communication system. The elements of the TMN 100 correspond with the elements of the protocol hierarchy 102 to their right. The TMM elements may be configured as hardware or software.

The TMN 100 is designed to be a run-time environment for TMN communication utilizing improved associations control 124, message routing 120, enhanced directory services ("EDS") application program interface ("API") 122; and local EDS database 123, also called local directory services database. An application, for example an agent object 110 or a manager 112, communicates with another application utilizing the TMN 100 environment. Applications communicate directly with application entity representation ("AER") 118 or a session control 114. The AER 118 accesses agent services 116 when appropriate to process service requests. The AER 118 communicates with the message routing 120, which interfaces with the external communication services 126. External communication services 126 can include the transmission control protocol/internet protocol ("TCP/IP") stack 128 or the X/Open Transport Interface ("XTI") stack 130. Message routing 120 routes messages using information retrieved from association control 124 and the EDSAPI 122.

Several features of the present system provide performance enhancements over existing systems. The Enhanced Directory Services ("EDS") API 122 uses Workspace and Session concepts similar to those in the X-Open's API to Directory Services ("XDS") specification. In one embodiment, when a session is opened the complete set of entries in the EDS database 304, (See FIG. 3) also called main directory services database, are loaded into a memory space in the EDS API 122, also called EDS Cache, to optimize performance. Alternatively, selective parts of the EDS database 304 can be loaded. Semaphores are used to maintain thread-safeness in multi-threaded implementations.

Since it is expected that significantly more read operations will be performed than modify operations, the EDS API 122 is optimized for the read operations. In order to optimize the read operation, the two approaches used are (a) use of a hash algorithm and (b) enhanced memory management. First, a hash algorithm with low collision probability for quick lookup is used. Second, an enhanced memory management is used to avoid performance degradation caused by memory allocation and deallocation common in thread-safe APIs. Although each query to the local EDS database 123 might return up to 20 memory pointers, the query operation returns the response in a single memory block. The EDS API 122 files the memory block internally with memory pointers pointing to static memory. This approach guarantees high performance because only a single memory block is allocated and freed for each directory service query. This remains true even if the query returns more than one directory service entry. This memory management mechanism guarantees thread-safeness because the EDS API 122 uses the concept of reference pointers to memory blocks. This guarantees that the contents of static data present in a directory entry are returned to the user and not lost, even if the local EDS database 123 is reloaded with the new directory contents.

Figure 2:
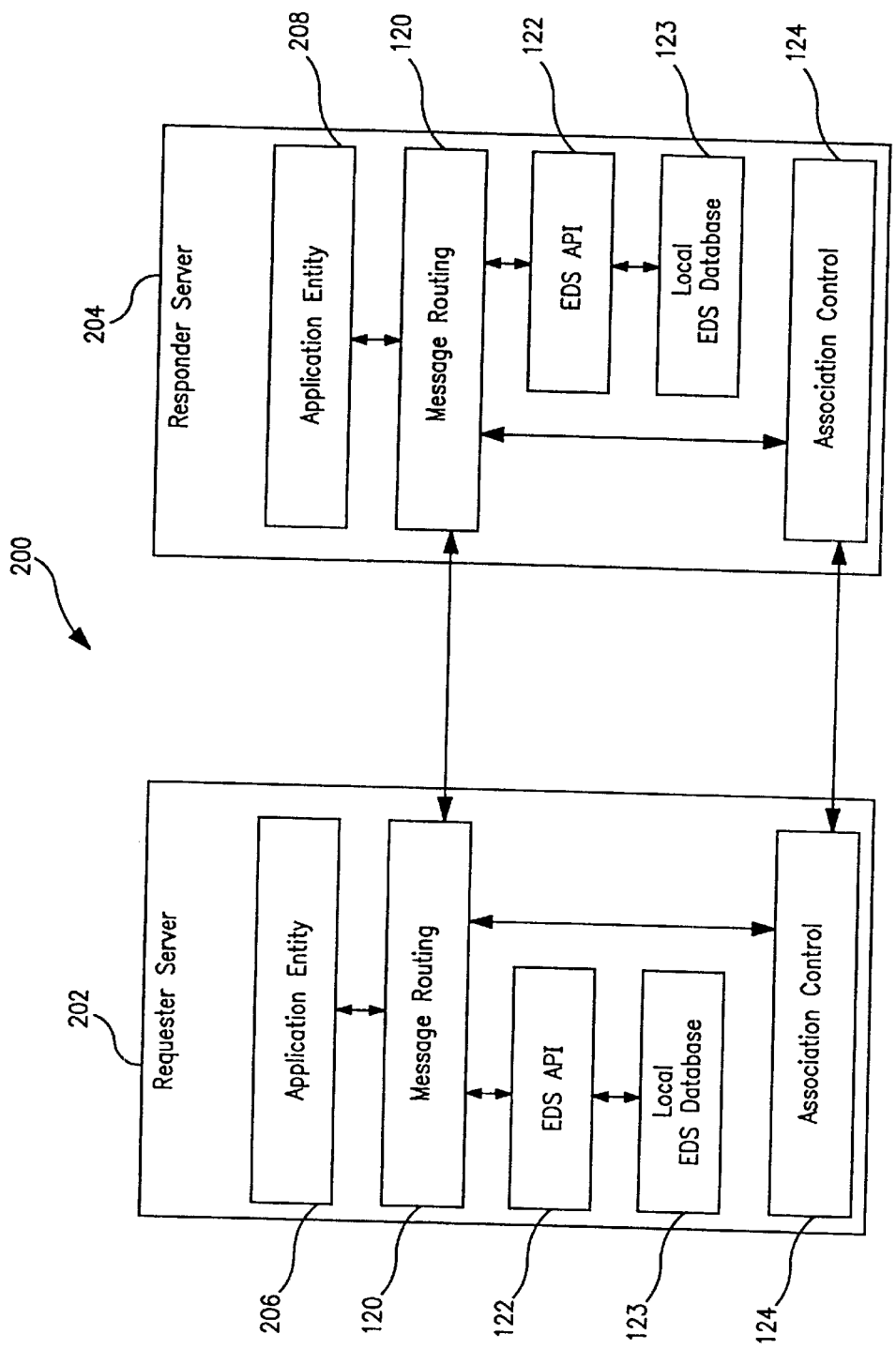
FIG. 2 is a representation of communication between a requester server application and responder server application.

In FIG. 2, the TMN system 200 illustrates a requester server 202 and a responder server 204 communicating using the TMN 100 system of FIG. 1. The requester server 202 and the responder server 204 each include at least one application entity 206 and 208 respectively, a message routing 120, a EDS API 122, and an association control 124.

In FIG. 3, a configuration is shown with a User Environment 308, also called an application server, a Directory Services Server Environment 300, and a Directory Services Update Application 306. The directory services server environment 300 includes a EDS process 302, also known as a "directory services daemon," and an EDS database 304. The directory services process 302 communicates with the directory services update application 306 and the EDS API 122. The EDS API 112 accesses the Local EDS Database 123.

The EDS process 302 receives messages from Directory Services Update Applications 306 that indicate that the EDS database 304 was changed by a Directory services Update Application 306. The EDS process 302 then sends a message through the EDS API 122, called a directory services update notice, to the other application entities 206 that use that EDS database (registered applications), notifying them of the changes. The EDS API 122 provides the routing information to the requesting application or to a dispatcher process 310 that routes the message between requesting and requested applications. If a dispatcher process 310 is used, the applications need not be provided with the routing information.

The EDS Process 302 can be a daemon. A daemon is UNIX process that provides services to user applications and utility applications. That is, it provides low level functions and is accessed through higher level processes.

Further, utility applications use the EDS API 122 to access the EDS database 304. The utility applications allow display of the contents of directory files in readable format, for example text format. Utility applications include a command-line and graphical interfaces for adding, deleting, and modifying entries in the EDS Database 304. The Enhanced Directory Services process 302 optionally provides real time notification to registered applications when modifications occur in the directory services database. A registered application is an application that has requested notification of such changes. Once an application is notified, the application selects when to process the changes.

The EDS process 302, also called the "EDS daemon," notifies registered applications about changes in the EDS Database 304. The Enhanced Directory Services process 302 receives a change notification message from the application that caused the EDS Database 304 to change. Two of the EDS Tools 418 (see FIG. 4) that cause changes to the EDS Database 304 are the command line tools "dsaddobj" and "dsdelobj," which add and delete objects, respectively. Once a change notice is received by the EDS process 302, all Enhanced Directory Services API applications currently using the changed EDS Database 304 are notified of the change. The applications then choose when to reload the new EDS Database contents into the Local EDS Database 123.

When the directory services process 302 receives an update request, also called a directory services update request, from the EDS API 122 in the directory services update application 306, the directory services process 302 sends a message to all applications that are registered to use the EDS database 304 that was modified. The modification can include an entry addition, deletion or modification. The EDS tool "dsaddobj" [tool] adds entries and "dsdelobj" tool deletes entries. Modification of entries can be done by a EDS API user application. The EDS process 302 sends a message to all registered applications indicating that a modification has occurred in the EDS database 304. Once the EDS API 122 receives the modification message, the EDS API 122 determines when to reload the modified EDS database 304 into the local EDS database 123.

By storing requested application's information in a directory services database, requesting applications need not track and monitor requested applications characteristics and routing information. Directory services manages the directory information by writing Registration Files and using the directory tools to add and remove CMIP routing information in directory services.

The Enhanced Directory Services Tools 418 include command line tools that implement a parser for the Registration File ("RF") format. The source RF is parsed and the appropriate EDS API calls are made to update the Local EDS Database 123. For example, the command "DSAddEntry0" is invoked by the dsaddobj tool to add an entry and the command "DSRemoveEntry0" is invoked by the dsdelobj tool to remove an entry.

The Enhanced Directory Services Tools 418 (See FIG. 4) include command line tools that implement a parser for the Registration File ("RF") format. The source RF is parsed and the appropriate EDS API calls are made to update the Local EDS Database 123. For example, article A command "DSAddEntry0" is invoked by the dsaddobj tool to add an entry and the Article A command "DSRemoveEntry0" is invoked by the dsdelobj tool to remove an entry.

Figure 4:
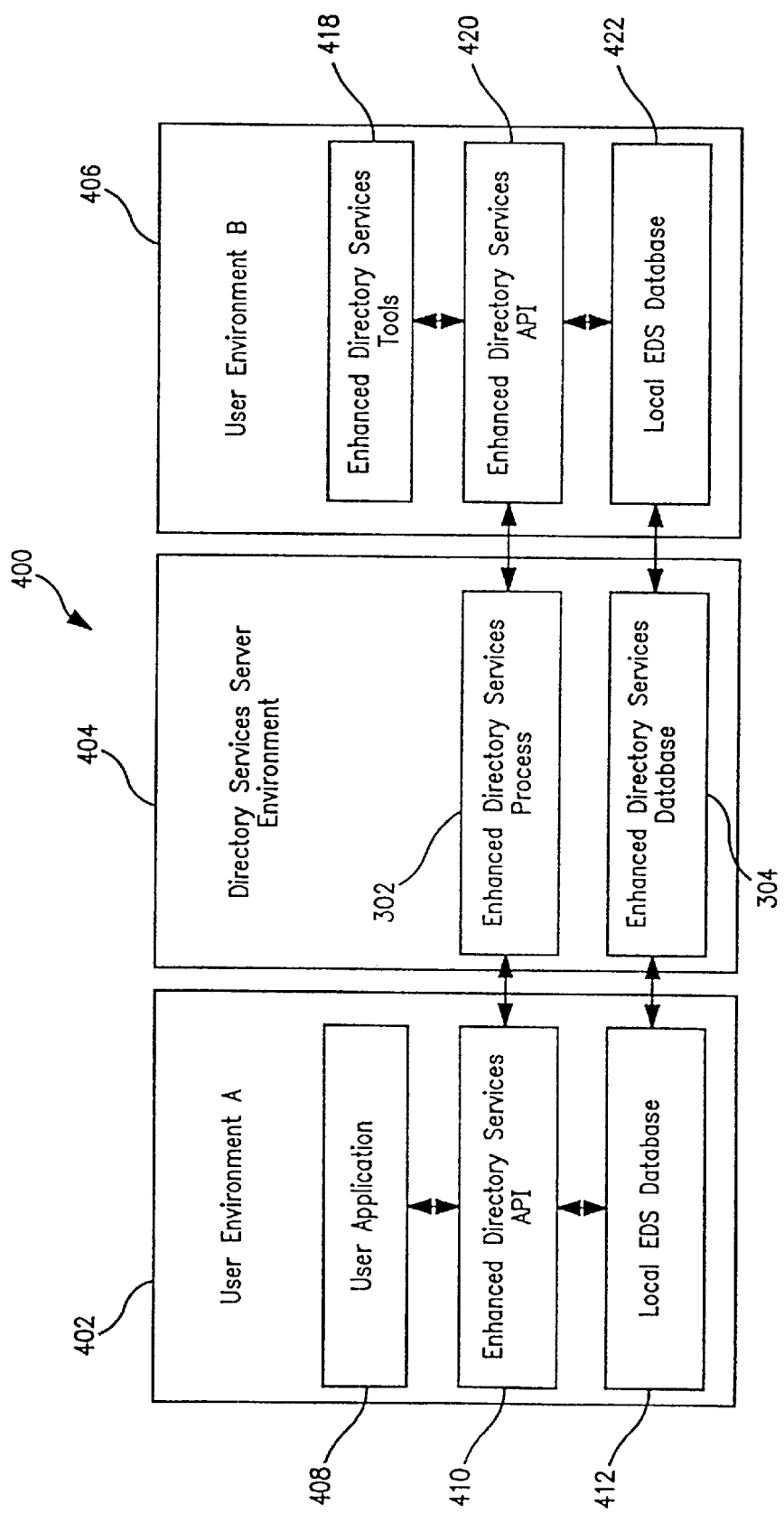
FIG. 4 is a representation of two user environments communicating with each other and a server directory services environment.

In FIG. 4, a communication system 400 includes a User Environment A 402, also called an application server, a Directory Services Server Environment, 404, and a User Environment B 406, also called an application server. The User Environment A 402 includes a User Application 408, an Enhanced Directory Services ("ADS") Application Programming Interface ("API") 410, and Local EDS database 412. The Directory Services Server Environment 404 includes an EDS Process 302 and an EDS database 304. The User Environment B 406 includes an EDS Tools 418, an EDS API 420, and a Local EDS Database 422. The Local EDS Database 422 is also called an EDS Cache.

The User Application 408 can act as the CMIP dispatcher daemon, as a CMIP based user application, or an EDS Tool, such as the EDS Tools 418. The User Application 408 can search, delete, add, or modify the EDS database 304.

The EDS database 304 is the master EDS database comparable to the EDS Database 304 shown in FIG. 3. The EDS database 304 can be a flat ASCII file, a database such as a relational database or any other storage format, such as an X.500 Directory Product. The EDS API's 418 and 410 communicate with the EDS Process 302 through socket connections in the present system. Other communication mechanisms, such as a CORBA ORB, may also be used.

The following example operations illustrate some of the functions of the communication system 400. The first scenarios includes a user application retrieving the routing information for a message the user application is about to transmit. The User Application 408 initializes and connects to the EDS Process 302 through the EDS API 410. Then, a copy of the EDS database 304 is loaded in the local directory services database 412. When the User Application 408 needs to transmit a message, the User Application 408 accesses the Local EDS Database 412 through the EDS API 410 and retrieves the desired routing information for the message.

The second scenarios illustrate the EDS database 304 update process. The EDS tools 418 includes the Article A "DSADDOBJ" process that adds a new managed object to the EDS database. The "DSADDOBJ" process connects to the EDS Process 302 through the EDS API 420. If the Local EDS Database 422 does not contain a copy of the EDS Database 304, a copy of the EDS Database 304 is loaded into the Local EDS Database 422. The DSADDOBJ process transmits the entry to be added to the EDS Database 304 through the EDS API 420. The EDS API 420 writes the updated entry into the local EDS database 422 and automatically into the EDS database 304. Then, the EDS API 420 sends a message to the EDS process 302 informing it that the EDS database 304 has changed. The EDS process 302 then notifies all registered user applications 408 that a change has occurred in the EDS Database 304. A registered application is a user application that uses the data from the EDS Database.

At a time decided by the EDS API 410 or the User Application 408, the EDS API 410 loads a new copy of the EDS Database 304 into the Local Directory Services Database 412. Normally, this new copy of the EDS Database 304 is used for all subsequent searches of the Local Directory Services Database 412. Existing links (associations) can continue to use data from the previous copy of the EDS Database 304 still in the Local EDS Database 412.

The EDS API 410 or the user application 408 can reload the local EDS database 412 either immediately or it can defer the update until a more appropriate time. In immediate mode, the database is updated immediately. Existing associations and links are maintained using data from the prior version. In deferred mode, after receiving notice of a change in the EDS database304, the user application 408 or the EDS API 410 decides when is the most appropriate time to reload the local EDS database 412. Appropriateness may be determined by the current activity of the user applications that access the particular local EDS database 412, process load of the machine the user application 408 or the local EDS database 412 is running on, or other factors.

Environments, such as User Environment A 402, User Environment B 406 and the Directory Services Server Environment 404, are logical grouping of applications, daemons, databases and other structures that need not reside on a single physical computer. For instance, the User Environment A could be distributed across several IBM RISC System 6000 in a cluster or network configuration.

While the invention has been disclosed in conjunction with the preferred embodiment, various modifications may be made in form and substance therein by those skilled in the art without departing from the spirit and scope of the invention, as defined in the appended claims.

What is claimed is:

1. A method for managing a main directory services database including the steps of:
    (a) receiving a directory services update request in a directory services server, the directory services server including a main directory services database, the directory services update request containing a request to modify the main directory services database;
    (b) updating the main directory services database in the directory services server based on the received directory services update request;
    (c) notifying a first application server including a directory services application program interface and a local services directory services database of the change to the main directory services database, the first application server being registered with the main directory services database; and
    (d) determining in the directory services application program interface when to stop utilizing the local services database and to begin utilizing the main directory services database.

2. The method of claim 1 wherein a second application server generates the directory services update request.

3. The method of claim 2 wherein the directory services update request being generated by a directory services application program interface within the second application server, wherein the second application server being distinct from the first application server.

4. A method of managing a local directory services database including the steps of:
    (a) receiving a directory services update notice in an application server from a directory services server, wherein the application server being registered with the directory services server and the application server including a directory services application program interface and a first local directory services database, wherein the directory services server includes a main directory services database, and wherein the directory services update notice indicating a change in the main directory services database;
    (b) loading a request for a copy of the updated main directory services database to be sent to the requesting application server;
    (c) receiving a copy of the updated directory services database at the requesting application server;
    (d) determining in the directory services application program interface when to stop utilizing the first local services database and to begin utilizing the updated directory services database;
    (e) storing the updated directory services database as a second local directory server database in the requesting application server;
    (f) accessing the first local directory services database for preexisting associations; and
    (g) accessing the second local directory services database for newly created associations.

5. The method of claim 4 further including after step (f) the steps of
    (g) deleting the first local directory services database after all preexisting associations are terminated.

6. The method of claim 4 wherein the main directory services database loaded by the requesting application server being a subset of the directory services database information on the directory services server.

7. A method of managing a local directory services database including the steps of:
    (a) receiving a directory services update notice in an application server from a directory services server, wherein the application server being registered with the directory services server and the application server including a directory services application program interface and a first local directory services database, wherein the directory services server includes a main directory services database, and wherein the directory services update notice indicating a change in the main directory services database;

(b) terminating all associations using the first local directory services database in the application server;

(c) transmitting a request for a copy of the updated main directory services database to be sent to the requesting application server;

(d) determining in the directory services application program interface when to stop utilizing the first local services database and to receive the updated directory services database;

(e) receiving a copy of the updated main directory services database at the requesting application server as a second local directory services database;

(f) accessing the second local directory services database for associations with the application server.

8. The method of claim 7 further including after step (e) the steps of:

(f) deleting the first local directory services database.

9. The method of claim 7 wherein the main directory services database transmitted to the requesting application server being a subset of the directory services database information on the directory services server.

10. A method of managing memory comprising:

(a) linking an application server to a remote directory services database, wherein the application including a directory services application program interface and a local directory services database;

(b) notifying the directory services application program interface in the application server of the link;

(c) determining in the directory services application program interface when to stop utilizing the local directory services database and to begin utilizing the remote directory services database.

* * * * *